US007783720B1

(12) United States Patent
Allavarpu et al.

(10) Patent No.: US 7,783,720 B1
(45) Date of Patent: Aug. 24, 2010

(54) CORBA METADATA GATEWAY TO TELECOMMUNICATIONS MANAGEMENT NETWORK

(75) Inventors: Sai V. Allavarpu, Pleasanton, CA (US); Rajeev Angal, San Jose, CA (US); Gihan R. Karunaratne, Fremont, CA (US); Mark B. McCall, Palo Alto, CA (US)

(73) Assignee: Oracle America, Inc., Redwood City, CA (US)

( * ) Notice: Subject to any disclaimer, the term of this patent is extended or adjusted under 35 U.S.C. 154(b) by 0 days.

(21) Appl. No.: 09/552,985

(22) Filed: Apr. 21, 2000

(51) Int. Cl.
*G06F 15/173* (2006.01)
*G06F 9/54* (2006.01)

(52) U.S. Cl. .................. 709/218; 709/203; 709/228; 713/100

(58) Field of Classification Search ................. 709/203, 709/206, 217, 218, 222, 224, 228, 332, 226, 709/227, 238; 380/49; 707/102, 103; 370/61, 370/235, 237; 710/11; 717/5; 713/100
See application file for complete search history.

(56) References Cited

U.S. PATENT DOCUMENTS

| | | | | |
|---|---|---|---|---|
| 5,406,557 A | * | 4/1995 | Baudoin | .................... 370/61 |
| 5,452,459 A | | 9/1995 | Drury et al. | |
| 5,511,122 A | | 4/1996 | Atkinson | |
| 5,577,251 A | * | 11/1996 | Hamilton et al. | ............ 718/101 |
| 5,586,260 A | | 12/1996 | Hu | |
| 5,632,032 A | | 5/1997 | Ault et al. | |
| 5,647,002 A | * | 7/1997 | Brunson | .................... 380/49 |
| 5,708,780 A | | 1/1998 | Levergood et al. | |
| 5,732,270 A | | 3/1998 | Foody et al. | |
| 5,758,186 A | * | 5/1998 | Hamilton et al. | .............. 710/11 |
| 5,815,708 A | * | 9/1998 | Kessler et al. | ............... 719/318 |
| 5,848,243 A | * | 12/1998 | Kulkarni et al. | ............ 709/228 |
| 5,870,749 A | | 2/1999 | Adusumilli | |
| 5,892,950 A | | 4/1999 | Rigori et al. | |

(Continued)

OTHER PUBLICATIONS

"What is CORBA?," Object Management Group, Inc., 1997-1999, 2 pages.

(Continued)

*Primary Examiner*—Khanh Q Dinh
(74) *Attorney, Agent, or Firm*—Robert C. Kowert; Meyertons, Hood, Kivlin, Kowert & Goetzel, P.C.

(57) ABSTRACT

A system and method for managing network devices using a metadata gateway. The metadata gateway provides translation of metadata to and from a database format and Interface Definition Language (IDL), which is operable across a plurality of platforms and across a plurality of programming languages. Metadata may be retrieved through the metadata gateway by a client manager application sending a request for type information for a managed object attribute or event in IDL through a CORBA Object Request Broker (ORB) to the metadata gateway, which then reads the type information from a metadata repository, where the type information is stored in a database format. The metadata gateway then translates the retrieved type information from the database format to IDL and sends the translated type information to the ORB, which sends the translated type information for the attribute or event to the client manager application. Metadata may be encoded through the metadata gateway by sending the metadata in IDL to the metadata gateway, which translates the type information from IDL to a database format and stores the type information in the metadata repository.

31 Claims, 8 Drawing Sheets

U.S. PATENT DOCUMENTS

| | | | |
|---|---|---|---|
| 5,941,978 | A | 8/1999 | Finni |
| 5,953,530 | A | 9/1999 | Rishi et al. |
| 5,974,438 | A | 10/1999 | Neufeld |
| 5,983,233 | A * | 11/1999 | Potonniee ............... 707/103 R |
| 5,987,440 | A | 11/1999 | ONeil et al. |
| 6,018,743 | A | 1/2000 | Xu |
| 6,023,579 | A * | 2/2000 | Hellgren et al. ............ 709/232 |
| 6,042,614 | A | 3/2000 | Davidson et al. |
| 6,085,240 | A | 7/2000 | Suzuki et al. |
| 6,176,883 | B1 | 1/2001 | Hooloway et al. |
| 6,182,154 | B1 * | 1/2001 | Campagnoni et al. ....... 719/315 |
| 6,202,199 | B1 | 3/2001 | Wygodny et al. |
| 6,205,482 | B1 | 3/2001 | Navarre et al. |
| 6,208,345 | B1 | 3/2001 | Sheard et al. |
| 6,209,018 | B1 | 3/2001 | Ben-Shachar et al. |
| 6,247,039 | B1 | 6/2001 | Callsen |
| 6,263,485 | B1 * | 7/2001 | Schofield ....................... 717/1 |
| 6,282,579 | B1 * | 8/2001 | Carre ......................... 719/313 |
| 6,282,701 | B1 | 8/2001 | Wygodny et al. |
| 6,289,393 | B1 | 9/2001 | Phillips et al. |
| 6,317,428 | B1 | 11/2001 | Mercouroff et al. |
| 6,321,337 | B1 | 11/2001 | Reshef et al. |
| 6,324,648 | B1 | 11/2001 | Grantges, Jr. |
| 6,330,598 | B1 | 12/2001 | Beckwith et al. |
| 6,343,332 | B1 | 1/2002 | Ueda |
| 6,356,930 | B2 | 3/2002 | Garg |
| 6,363,421 | B2 | 3/2002 | Barker et al. |
| 6,378,124 | B1 | 4/2002 | Bates et al. |
| 6,378,125 | B1 | 4/2002 | Bates et al. |
| 6,445,776 | B1 * | 9/2002 | Shank et al. ............... 379/88.1 |
| 6,467,052 | B1 | 10/2002 | Kaler et al. |
| 6,496,833 | B1 * | 12/2002 | Goldberg et al. ............ 707/102 |
| 6,530,079 | B1 | 3/2003 | Choi et al. |
| 6,539,501 | B1 | 3/2003 | Edwards |
| 6,754,693 | B1 * | 6/2004 | Roberts et al. .............. 709/205 |
| 6,775,267 | B1 * | 8/2004 | Kung et al. ................. 370/352 |

OTHER PUBLICATIONS

"CORBA Overview," Object-Management Group, Inc., 1995, 13 pages.
"Overview of CORBA," Object Management Group, Inc., Jan. 19, 2000, 4 pages.
"Java, RMI and CORBA," Object Management Group, Inc., 1997-1999, 8 pages.
"A CORBA Primer," Technical Overview, A White Paper, Segue Software, 7 pages.
"Development Environment," Sun Microsystems, Inc., 1994-2000, 11 pages.
"Solstice Enterprise Manager 2.1 Reviewr's/Evaluator's Guide for Telecommunications Network Management," Sun Microsystems, Inc., 1998, pp. 1-45.
"Solstice Enterprise Manager 2.1: A Technical White Paper,", Sun Microsystems, Inc. Chapters 1-6, 68 pages, 1997.
"Solstice Enterprise Manager 3.0: Satisfying the Needs of Telecom Carriers & Service Providers," Sun Microsystems, Inc., 1994-2000, 3 pages.
"Joint Inter Domain Management (JIDM)," The Open Group, Jan. 10, 2000, 5 pages.
"Specification of Abstract Syntax Notation One (ASN.1)," International Telecommunication Union, ITU-T Recommendation X.208, 1988 and 1993, pp. 1-72.
"Specification of Basic Encoding Rules for Abstract Syntax Notation One (ASN.1)," International Telecommunication Union, ITU-T Recommendation X.209, 1988 and 1993, pp. 1-23.
"Inter-Domain Management: Specification Translation,", The Open Group, 1997, 281 pages.
"CORBA-Based Telecommunication Network Management Systems," Object Management Group, Inc., May 1996, pp. 1-29.
"Intelligent Networking with CORBA, *A White Paper*," Nortel, et-al., Draft-2.0, Oct. 31, 1996, pp. 1-7.
"Inter-Domain Management Between CORBA and SNMP: Web-Based Management-CORBA/SNMP Gateway Approach," Subrata Mazumdar, Lucent Technologies, 1996, pp. 1-16.
"Mapping of Common Management Information Services to CORBA Objects Services Specification," Subrata Mazumdar, Lucent Technologies, Mar. 10, 1997, pp. 1-68.
"A Discussion of the Object Management Architecture," Object Management Group, Inc., Jan. 1997, pp. 1-1 to 1-6, 2-1 to 2-6, 3-1 to 3-8, 4-1 to 4-12, A-1 to A-8.
"CMIS/C++: Application Programming Interface," Network Management Forum, Issue 1.0, Feb. 1998, pp. 1-226.
"JIDM Interaction Translation," Final Submission to OMG's CORBA/TMN Interworking RFP, Object Management Group, Inc. Edition 4.3, OMG Document Number: telecom/98-10-10, Oct. 1998, 273 pages.
Guy Genilloud, "An Analysis of the OSI Systems Management Architecture from an ODP Perspective," IEEE, 1996, pp. 72-81.
N. Lynch, et al., "Web Enabled TMN Manager," Telecommunications, Conference Publication No. 451, Apr. 1, 1998, pp. 121-126.

* cited by examiner

CORBA METADATA GATEWAY TO TELECOMMUNICATIONS MANAGEMENT NETWORK

BACKGROUND OF THE INVENTION

1. Field of the Invention

The present invention relates generally to computer software. More particularly, the present invention relates to network management software.

2. Description of the Relevant Art

The field of network management involves the management of networked devices, often remotely. A computer network is a linked group of two or more computers. Generally, networks may be classified as Local-Area Networks (LANs) or Wide-Area Networks (WANs). In a LAN, the computers or devices are typically connected together within a "local" area such as a home, office, or group of offices. In a WAN, the computers or devices are typically separated by a greater distance and are often connected via telephone/communication lines, radio waves, or other suitable means of connection.

Networks are usually classified using three properties: topology, protocol, and architecture. Topology specifies the geometric arrangement of the network. Common topologies are bus, ring, and star configurations. A network's protocol specifies a common set of rules and/or signals, such as Ethernet or Token Ring, that the networked devices use to communicate with each other. A network's architecture typically specifies one of the two major types of network architecture: peer-to-peer or client/server. In a peer-to-peer networking configuration, there is no server, and computers simply connect with each other in a workgroup to share files, printers, services, and Internet access. Client/server networks often include a domain controller to which all of the networked computers log on. This server may provide various services such as centrally routed Internet access, e-mail, file sharing, printer access, and security services.

Many types of devices may be managed over a network, such as printers, scanners, phone systems, copiers, and many other devices and appliances configured for network operation. Managing such devices tends to require that the data types of each device's control parameters and signals be well defined. For example, a networked printer might have a Boolean status parameter that indicates whether the device is currently on or off and a control parameter which turns the printer on or off. The printer may also be capable of generating an alert signal indicating, for example, that the toner level is low. The network management software should be able to read and write these data correctly in order to manage the device. To do this, information about the data is required. Such information is referred to as metadata, or "data about data." Metadata may typically describe what type of data (string, integer, Boolean, structure) an object has and how the data are formatted. Metadata is essential for understanding information related to managed devices, as well as information stored in data warehouses. Typically, network management software manages a given device by storing and manipulating a representation of its pertinent data as a software object, herein referred to as a "managed object." This object is the virtual representation of the device on the network.

FIG. 1a illustrates an example of typical elements of a telecommunications network. The telecommunications world is characterized by devices such as cell phones, cell phone towers and other kinds of towers 156, phone systems 151, faxes 152, routers 153, switches 154, satellite dishes 155, etc., which may be interconnected via networks 108a. In response to the network management needs of this technology sector, a conceptual framework for telecom network management called Telecommunications Management Network (TMN) was developed by the TeleManagement Forum (TMF). TMN defines the relationship between basic network building blocks, such as network elements, different network protocols, and operations systems, in terms of standard interfaces. Generally, a TMN system includes Agent hardware 150, Manager software 170, and Agent software 160. The Agent hardware 150 includes the managed devices such as those shown in FIG. 1a. The Manager software 170 includes any application used to manage a networked device. These manager applications, or client applications, may be installed and executed on one or more client computer systems 171a, 171b, ..., 171n. The Agent software 160 includes the software interface between the Manager software 170 (for communications via network 108b) and the Agent hardware 150 (for communications via network 108a). The Agent software 160 may be installed and executed on one or more server computer systems 161a, 161b, ..., 161n. In some instances, the Agent software 160 and Manager software 170 may be installed and executed on the same computer system. The Agent software 160 may also reside, in whole or part, on the Agent hardware 150 itself.

One TMN approach to managing objects over a network is the Simple Network Management Protocol (SNMP), a set of protocols for managing complex networks. SNMP works by sending messages, called protocol data units (PDUs), to different parts of a network. SNMP-compliant devices, called agents, store data about themselves in Management Information Bases (MIBs) and return this data to the SNMP requesters. The metadata used by SNMP to describe managed object data variables includes the variable title, the data type of the variable (e.g. integer, string), whether the variable is read-only or read-write, and the value of the variable. SNMP works over the TCP/IP (Transport Control Protocol/Internet Protocol) communication stack. SNMP also uses UDP over IP, and also may support TCP over IP. It is widely held, however, that SNMP was developed as a simple "quick fix" and was never intended to be a permanent solution to network management. Consequently, one problem with SNMP is that the information it specifies is neither detailed nor well-organized enough to adequately serve the expanding needs of modern networking.

Another example of a TMN network management protocol is the Common Management Information Protocol (CMIP). In the U.S. the CMIP protocol is primarily run over TCP/IP, while in Europe it is generally run over the OSI (Open Systems Interconnection) communication stack and was designed to replace SNMP and address SNMP's shortcomings by providing a larger, more detailed network manager. Its basic design is similar to SNMP: Management requests, management responses, and notifications are employed to monitor a network. These correspond to SNMP's PDUs. CMIP, however, contains eleven types of messages, compared to SNMP's five types of PDUs.

In CMIP, variables are seen as complex and sophisticated data structures with many attributes. These include: variable attributes, which represent the variable's characteristics (e.g., its data type, whether it is writable); variable behaviors, or the actions of that variable that can be triggered; and notifications, or event reports generated by the variable whenever a specified event occurs (e.g., a terminal shutdown would cause a variable notification event).

As a comparison, SNMP only employs variable attributes and notifications, but not variable behaviors. One of the strongest features of the CMIP protocol is that its variables not only relay information to and from the terminal (as in SNMP), but they can also be used to perform tasks that would be impossible under SNMP. For instance, if a terminal on a network cannot reach its fileserver for a predetermined number of tries, then CMIP can notify the appropriate personnel of the event. With SNMP, a user would need to explicitly keep track of the number of unsuccessful attempts to reach the fileserver. CMIP thus results in a more efficient network management system, as less work is required by a user to keep updated on the status of the network.

A significant disadvantage of the CMIP protocol is that it requires more system resources than SNMP, often by a factor of ten. Thus, any move to CMIP from SNMP requires a dramatic upgrade in network resources. Another disadvantage with CMIP is that it is very difficult to program; the variable metadata includes so many different components that few programmers are generally able to use the variables to their full potential.

Both of the above protocols have been implemented in a number of programming languages, such as C, C++, and Java™. However, network management software which takes advantage of SNMP or CMIP must be written specifically for the language of the protocol implementation. In other words, SNMP-based and CMIP-based network management software is dependent upon a particular programming language and protocol implementation.

A middleware standard used extensively in network management is the Common Object Request Broker Architecture (CORBA), which is provided by the Object Management Group (OMG). CORBA specifies a system that provides interoperability between objects in a heterogeneous, distributed environment and in a way transparent to the programmer. Its design is based on the OMG Object Model, which defines common object semantics for specifying the externally visible characteristics of objects in a standard and implementation-independent way. In this model, clients request services from objects (which will also be called servers) through a well-defined interface. This interface is specified in the OMG Interface Definition Language (IDL).

In CORBA, a client accesses an object by issuing a request to the object. The request is an event, and it carries information including an operation, the object reference of the service provider, and actual parameters, if any. The object reference is an object name that reliably defines an object.

A central component of CORBA is the Object Request Broker (ORB). The ORB encompasses the communication infrastructure necessary to identify and locate objects, handle connection management, and deliver data. In general, the ORB is not required to be a single component; it is simply defined by its interfaces. The basic functionality provided by the ORB includes passing the requests from clients to the object implementations on which they are invoked. The ORB acts as the middleware between clients and servers. In the CORBA model, a client can request a service without knowing anything about what servers are attached to the network. The various ORBs receive the requests, forward them to the appropriate servers, and then hand the results back to the client.

In CORBA, a client first looks up the object (server) it wants to communicate with. The ORB, as a result of the lookup operation, returns an object reference (a handle) of the server to the client. The client then uses the object reference to invoke operations on the object as a function call in the chosen programming language. The ORB intercepts the client request, collects the information about the operation and the request parameter values, encodes it in IIOP, and sends it to the object (server). The ORB on the object side (server) translates the request into a programming language specific function call on the server object. The server object then processes the request and returns a response, if any. The ORB intercepts the response, encodes the response and its parameters into IIOP, and sends it to the client. The ORB on the client side then returns the response to the client as the return value of the function call originally made as part of issuing the request.

GDMO (Guidelines for Definition of Managed Objects) is a standard for defining objects in a network in a consistent way. With a consistent "language" for describing such objects as workstations, LAN servers, and switches, programs can be written to control or sense the status of network elements throughout a network. GDMO prescribes how a network product manufacturer must describe the product formally so that others can write programs that recognize and deal with the product. Using GDMO with ASN1, descriptions may be made of the class or classes of the object, how the object behaves, its attributes, and classes that it may inherit.

GDMO is part of the CMIP and also the guideline for defining network objects under TMN. The object definitions created using GDMO and related tools form a Management Information Base (MIB). GDMO uses Abstract Syntax Notation One (ASN1) as the rules for syntax and attribute encoding when defining the objects. Abstract Syntax Notation One is a language that defines the way data is sent across dissimilar communication systems. ASN1 ensures that the data received is the same as the data transmitted by providing a common syntax for specifying application layer (e.g., program-to-program communications) protocols. Each communications system contains a similar ASN1 encoding/decoding scheme written in the language used on that particular system. When one system wants to send data to another, the first system encodes the data into ASN1, sends the data, and the second system receives and decodes the data using the decoder written in the language used on that system.

TMN provides information modeling standards such as GDMO and MIB to model information about network devices that need to be managed. As mentioned above, metadata is the data about the class, attributes, and other features of each managed object class. TMN metadata browser applications may browse through the modeling information to present information about various managed objects in the network. Currently, however, GDMO/ASN1 metadata browser applications may have to use programming-language-specific, TMN-platform-specific, and hardware-specific APIs to access and display TMN metadata information. This makes it difficult for such applications to interoperate with other TMN applications that serve various TMN functions. It is would be desirable to access object metadata in a cross-platform, cross-programming language manner.

Therefore, improved systems and methods for managing network devices are desired.

SUMMARY OF THE INVENTION

The problems outlined above are in large part solved by various embodiments of a metadata gateway system and method as disclosed herein. Manager applications may be communicatively coupled to an object request broker such as a CORBA Object Request Broker (ORB), and may send and receive messages and events via IIOP/IDL. Also coupled to the ORB is a metadata gateway. The metadata gateway is communicatively coupled to a metadata repository, which may contain metadata concerning object classes for a plurality of managed objects which correspond to devices on a network. The metadata stored in the metadata repository may include class type information expressed in a database format. The metadata gateway may send and receive metadata from the metadata repository database via a communication protocol such as Common Management Information Service (CMIS).

In one embodiment, the metadata gateway provides translation of the metadata to and from the database format and an interface definition language, such as Interface Definition Language (IDL). Therefore, the metadata gateway comprises an external, IDL-based interface to the object metadata which is operable across a plurality of platforms and across a plurality of programming languages. CORBA-based clients, as well as non-JIDM clients, may use the metadata gateway to access ASN1 type information about managed object attributes or events and traverse the type tree.

In one embodiment, the metadata gateway may include a library of data types expressed in an abstract syntax notation, such as Abstract Syntax Notation 1 (ASN1). The abstract syntax notation comprises a metadata notation language that may be used to represent metadata for managed objects. The library of abstract syntax notation types may be coupled to the metadata repository via a proprietary or platform-specific interface such as Portable Management Interface (PMI). The metadata gateway may further include a plurality of object types, where each object type may include one or more of the data types from the library of data types. In one embodiment, the plurality of object types comprises CORBA Objects. Requested metadata in the form of the object type nodes may be translated to IDL through an IDL implementation before being sent through the ORB to the requesting manager application.

In one embodiment, the translation of the type information from the database format to the interface definition language may involve translation of the type information from the database format to an abstract syntax notation, from the abstract syntax notation to an object specification language, and from the object specification language to the interface definition language. An information model of the managed object may be considered to exist in each of these data forms.

The metadata gateway may be implemented on a single server machine, or distributed over a plurality of servers, where each of the plurality of servers presents a substantially identical view of the metadata gateway to a client manager application.

In one embodiment, providing access to metadata through the metadata gateway may include defining IDLs to provide the functionality to return the Type of a given attribute name or object ID (OID) as well as providing means to "walk" the subtypes given a Type. "Walking the subtypes" includes recursively stepping through and into object type nodes to access component subtypes of a non-primitive object data type.

In one example of the use of the metadata gateway, a user may encode an IDL value for a managed object attribute by first getting Type information for the attribute. Then the user may walk the Type and encode IDL values based on the subtypes. In another example of the use of the metadata gateway, a user may decode an IDL value for a managed object attribute. Again, the user may first get Type information for the attribute and then may walk the Type and decode subcomponent values off the IDL value. In yet another example of the use of the metadata gateway, a user may wish to decode an Event received as an IDL value. The user may get Event Type information from the IDL value, then get Type information for the Event Type, and finally, walk the Type and decode subcomponent values off the IDL value.

In one embodiment, the component subtypes of a managed object type may be represented as a tree structure. In one embodiment, this type hierarchy may be represented by recursive containment, wherein each type structure contains its children in the tree. In this case, walking the type structure involves recursively stepping through and into each subcomponent of the type structure. Information on ASN1Types is returned in IDL structures to avoid the overhead of having too many CORBA objects to store and maintain. The fact that a given managed object's structured data type may include all subtype components explicitly as recursively contained substructures facilitates the "type walking" process mentioned above.

In one embodiment, metadata may be retrieved through the metadata gateway by a client manager application sending a request for type information for a managed object attribute or event to an object request broker, such as a CORBA ORB, in an interface definition language such as OMG IDL. The metadata gateway receives the request for type information from the object request broker, then reads the type information from a metadata repository, where the type information is stored in a database format. The metadata gateway then translates the retrieved type information from the database format to the interface definition language and sends the translated type information to the object request broker, which sends the translated type information for the attribute or event to the client manager application.

In one embodiment, metadata may be encoded through the metadata gateway by a client manager application sending a request to encode type information for a managed object attribute or event to an object request broker, such as CORBA ORB in an interface definition language such as OMG IDL. The metadata gateway receives the request from the object request broker and translates the type information from the interface definition language to a database format. Finally, the metadata gateway stores the type information in the metadata repository.

BRIEF DESCRIPTION OF THE DRAWINGS

Other objects and advantages of the invention will become apparent upon reading the following detailed description and upon reference to the accompanying drawings in which.

Figure 1A:
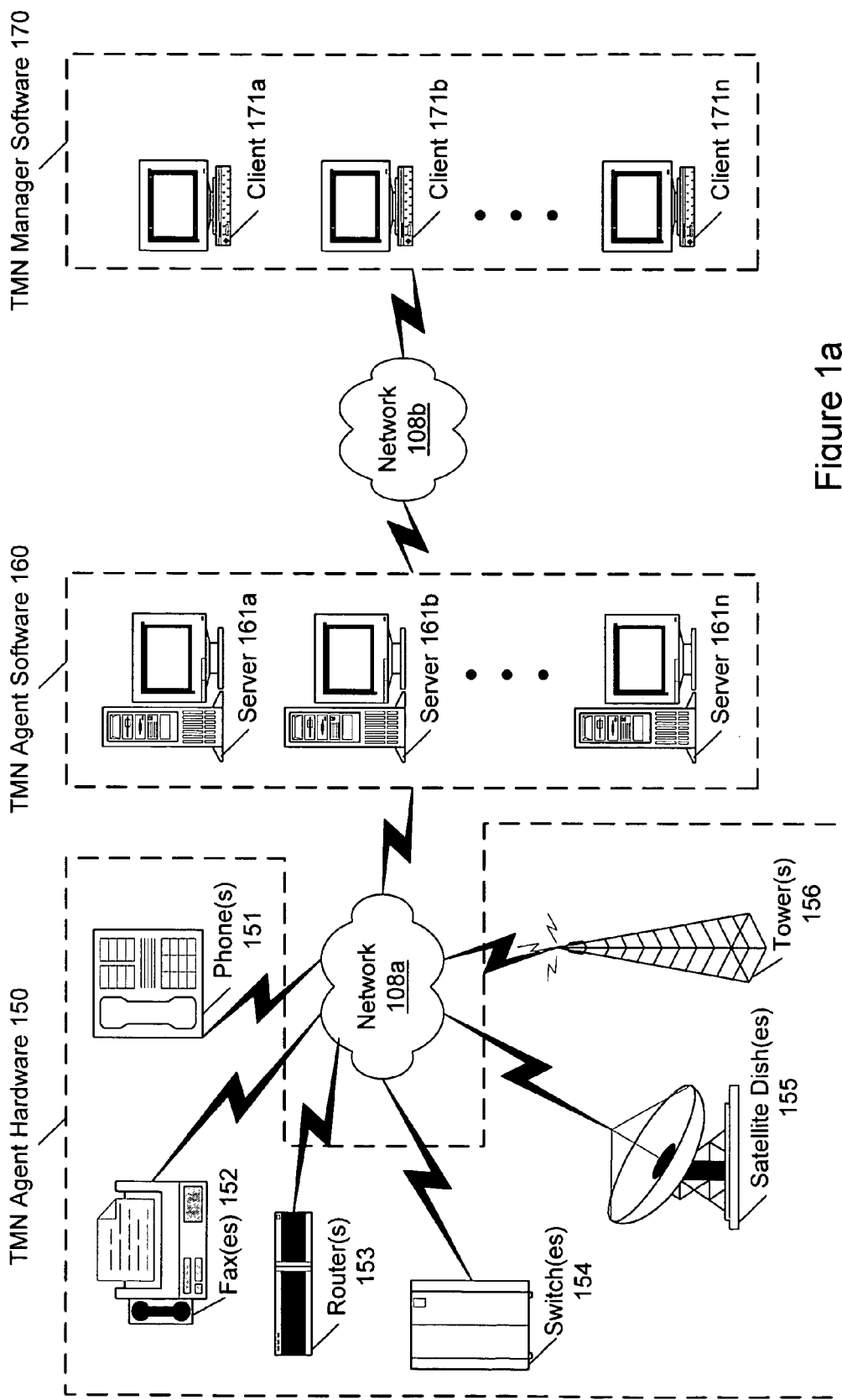
FIG. 1a illustrates an example of typical elements of a telecommunications network.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF SEVERAL EMBODIMENTS

Figure 1B:
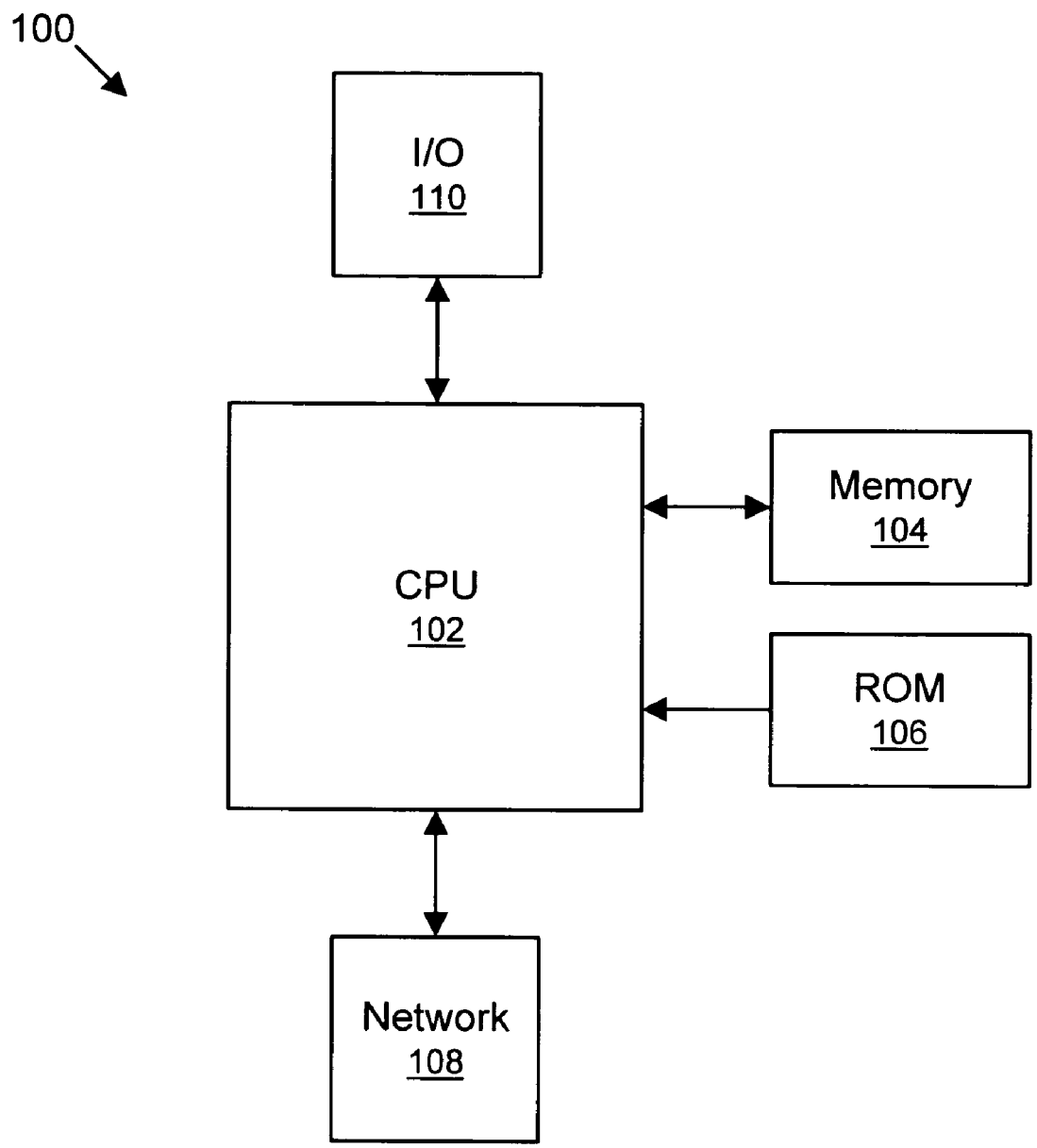
FIG. 1b is an illustration of a typical computer system architecture which is suitable for implementing various embodiments.

FIG. 1b: A Typical Computer System

Turning now to the drawings, FIG. 1b is an illustration of a typical, general-purpose computer system 100 which is suitable for implementing various embodiments of the system and method for network management as disclosed herein. The computer system 100 includes at least one central processing unit (CPU) or processor 102. The CPU 102 is coupled to a memory 104 and a read-only memory (ROM) 106. The memory 104 is representative of various types of possible memory media: for example, hard disk storage, floppy disk storage, removable disk storage, or random access memory (RAM). The terms "memory," "memory medium," and "storage medium" may include an installation medium, e.g., a CD-ROM or floppy disk, a computer system memory such as DRAM, SRAM, EDO RAM, etc., or a non-volatile memory such as a magnetic media, e.g., a hard drive or optical storage. The memory medium may include other types of memory as well, or combinations thereof. In addition, the memory medium may be located in a first computer in which the programs are executed, or may be located in a second different computer which connects to the first computer over a network. In the latter instance, the second computer provides the program instructions to the first computer for execution.

As shown in FIG. 1b, typically the memory 104 permits two-way access: it is readable and writable. The ROM 106, on the other hand, is readable but not writable. The memory 104 and/or ROM 106 may store instructions and/or data which implement all or part of the system and method described in detail herein, and the memory 104 and/or ROM 106 may be utilized to install the instructions and/or data. In various embodiments, the computer system 100 may take various forms, including a personal computer system, desktop computer, laptop computer, palmtop computer, mainframe computer system, workstation, network appliance, network computer, Internet appliance, personal digital assistant (PDA), embedded device, smart phone, television system, or other suitable device. In general, the term "computer system" can be broadly defined to encompass any device having a processor which executes instructions from a memory medium.

The CPU 102 may be coupled to a network 108. The network 108 is representative of various types of possible networks: for example, a local area network (LAN), wide area network (WAN), or the Internet. The system and method for network management as disclosed herein may therefore be implemented on a plurality of heterogeneous or homogeneous networked computer systems 100 through one or more networks 108. The CPU 102 may acquire instructions and/or data for implementing system and method for network management as disclosed herein over the network 108.

Through an input/output bus 110, the CPU 102 may also coupled to one or more input/output devices that may include, but are not limited to, video monitors or other displays, track balls, mice, keyboards, microphones, touch-sensitive displays, magnetic or paper tape readers, tablets, styluses, voice recognizers, handwriting recognizers, printers, plotters, scanners, and any other devices for input and/or output. The CPU 102 may acquire instructions and/or data for implementing the system and method for network management as disclosed herein through the input/output bus 110.

The computer system 100 is operable to execute one or more computer programs. The computer programs may comprise operating system or other system software, application software, utility software, Java™ applets, and/or any other sequence of instructions. Typically, an operating system performs basic tasks such as recognizing input from the keyboard, sending output to the display screen, keeping track of files and directories on the disk, and controlling peripheral devices such as disk drives and printers. Application software runs on top of the operating system and provides additional functionality. Because applications take advantage of services offered by operating systems, and because operating systems differ in the services they offer and in the way they offer the services, an application must usually be designed to run on a particular operating system. The computer programs are stored in a memory medium or storage medium such as the memory 104 and/or ROM 106, or they may be provided to the CPU 102 through the network 108 or I/O bus 110.

In one embodiment, the computer programs executable by the computer system 100 may be implemented in an object-oriented programming language. In an object-oriented programming language, data and related methods can be grouped together or encapsulated to form an entity known as an object. All objects in an object-oriented programming system belong to a class, which can be thought of as a category of like objects which describes the characteristics of those objects. Each object is created as an instance of the class by a program. The objects may therefore be said to have been instantiated from the class. The class sets out variables and methods for objects which belong to that class. The definition of the class does not itself create any objects. The class may define initial values for its variables, and it normally defines the methods associated with the class (i.e., includes the program code which is executed when a method is invoked.) The class may thereby provide all of the program code which will be used by objects in the class, hence maximizing re-use of code which is shared by objects in the class.

Figure 2:
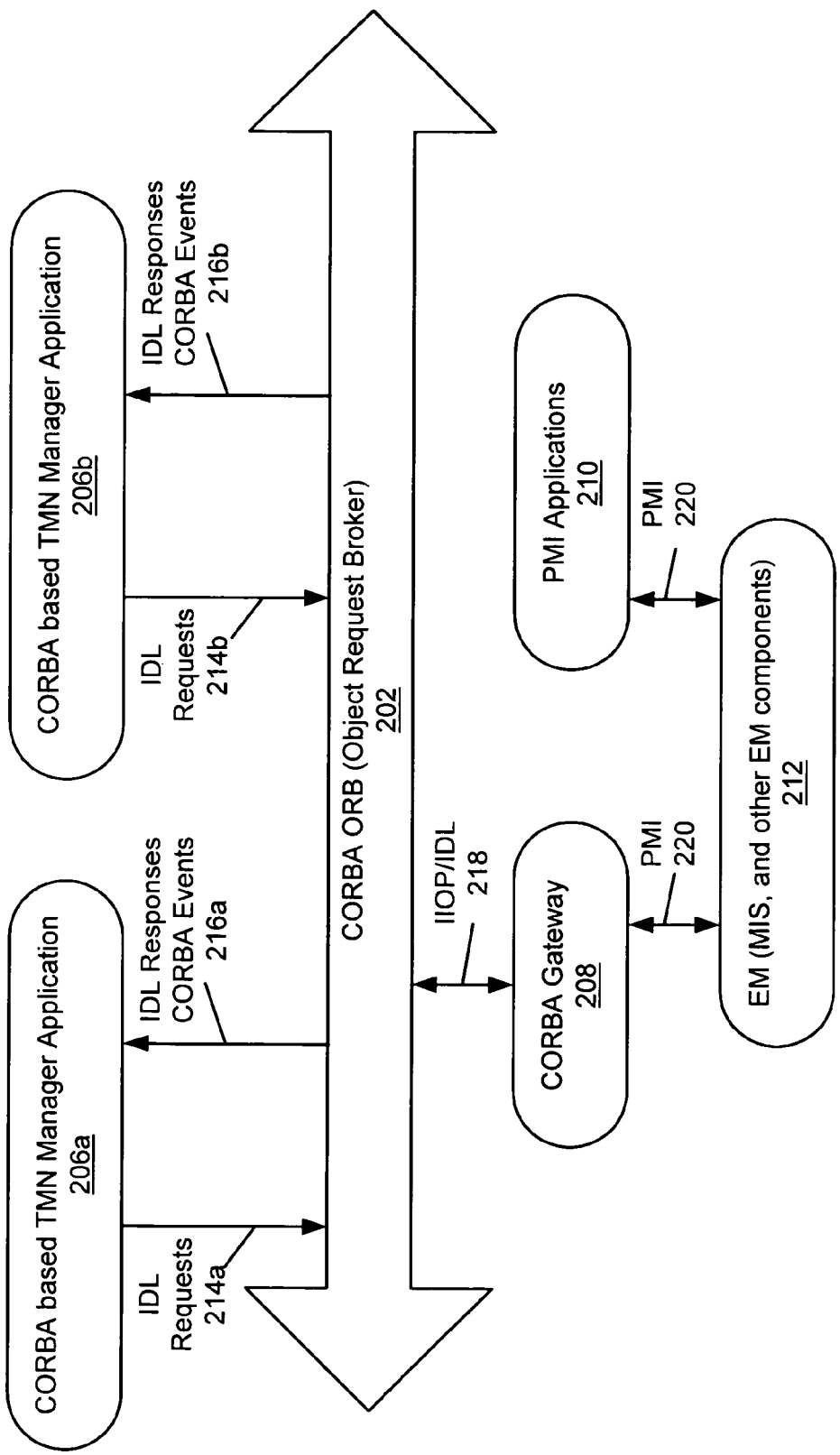
FIG. 2 is an illustration of a CORBA gateway to an enterprise manager according to one embodiment.

FIG. 2: CORBA Gateway

FIG. 2 illustrates a CORBA gateway from CORBA-based applications to an enterprise manager according to one embodiment. In one embodiment, the system may be configurable to manage various networked objects, such as printers, scanners, phone systems, copiers, and many other devices and appliances configured for network operation. For purposes of simplicity, similar components, e.g., manager applications 206a and 206b, may be referred to collectively herein by a single reference numeral, e.g., 206. As shown in FIG. 2, CORBA-based TMN manager applications 206 may be communicatively coupled to a CORBA Object Request Broker (ORB) 202. The manager applications 206 may be operable to send Interface Definition Language (IDL) requests 214 and receive IDL responses and CORBA events 216 through the CORBA ORB 202. A CORBA gateway 208 may also be communicatively coupled to the CORBA ORB 202 and be operable to communicate with the CORBA ORB 202 via communications methods 218 such as the Internet Inter-Object Protocol (IIOP), also known as the Internet Inter-ORB Protocol, and IDL. IIOP is a protocol developed by the Object Management Group (OMG) to implement CORBA solutions over the World Wide Web. Unlike HTTP, IIOP enables browsers and servers to exchange integers, arrays, and more complex objects.

In one embodiment, an enterprise manager 212 may be coupled to the CORBA gateway 208 via a proprietary or platform-dependent interface such as Portable Management Interface (PMI) 220 from Sun Microsystems, Inc. The enterprise manager 212 may include various enterprise management components such as a Management Information System (MIS), etc. Also coupled to the enterprise manager 212 via PMI 220 may be one or more PMI applications 210. PMI applications may include, for example, applications which provide access to event notification, subscription, and propagation services and access to object instance information. In one embodiment, the enterprise manager 212 may be Solstice Enterprise Manager (SEM) from Sun Microsystems, Inc., and examples of the one or more PMI applications 210 that use PMI to communicate with the SEM MIS may include SEM Viewer, SEM Alarm Manager, SEM Discovery, etc. In one embodiment, the CORBA gateway 208 may translate the CORBA manager requests 214 from IDL to PMI requests 220. Similarly, the CORBA gateway 208 may translate the enterprise manager PMI responses and PMI events 220 to IDL/IIOP responses and events 218 which may be passed on through the CORBA ORB 202 to the manager applications 206 in the form of IDL responses and CORBA events 216.

Figure 3:
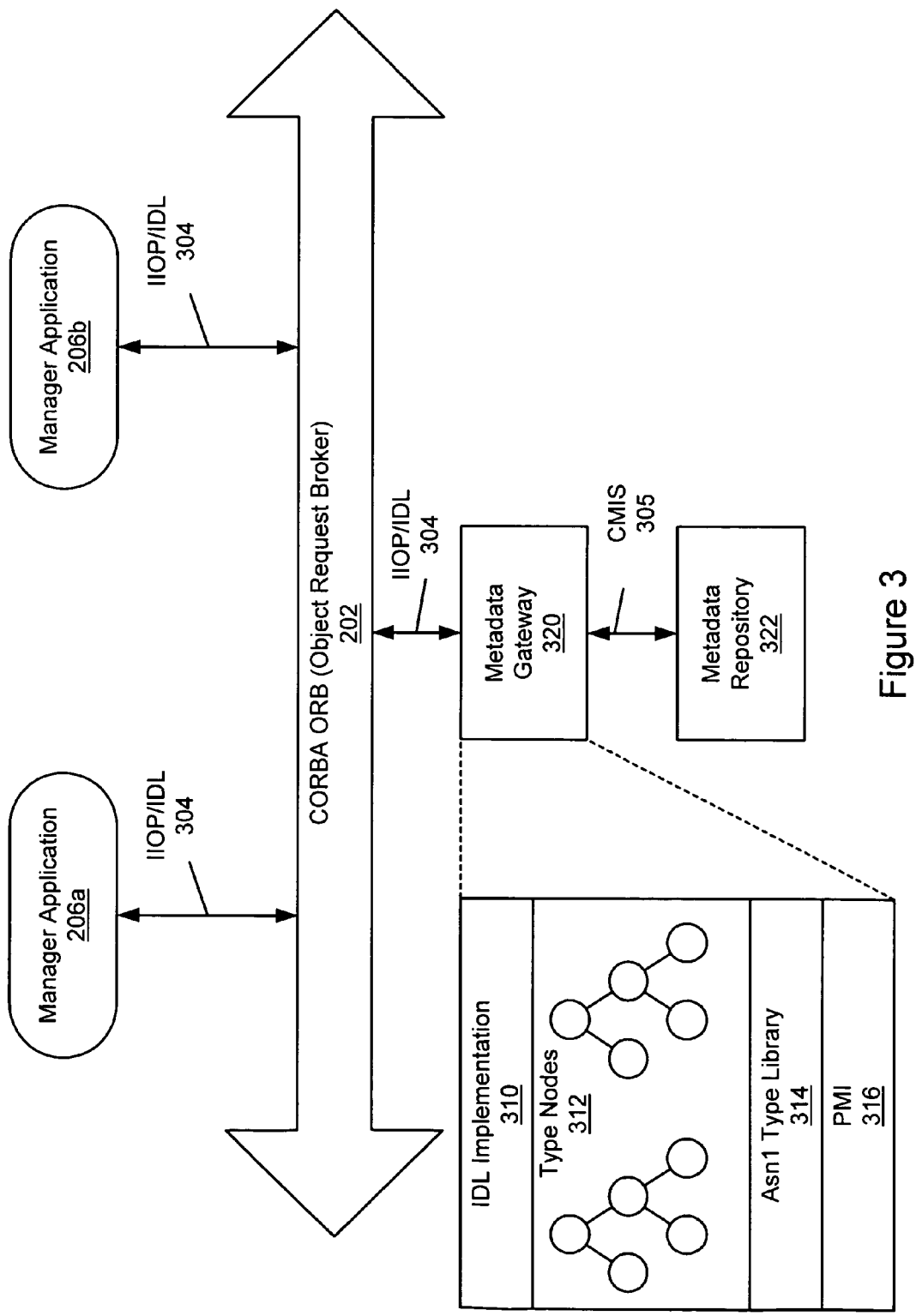
FIG. 3 is an illustration of a metadata gateway according to one embodiment.

FIG. 3: Metadata Gateway

FIG. 3 illustrates a metadata gateway 302 according to one embodiment. In one embodiment, the metadata gateway 302 may be a component of the general CORBA gateway 208 described with reference to FIG. 2. As FIG. 3 shows, manager applications 206 may be communicatively coupled to an object request broker such as a CORBA Object Request Broker (ORB) 202. The manager applications 206 may be operable to send and receive messages and events via IIOP/IDL 304. Also coupled to the ORB is a metadata gateway 320, which may also be referred to as a metadata repository (MDR) gateway. The metadata gateway 320 is communicatively coupled to a metadata repository 322 which may contain metadata concerning object classes for a plurality of managed objects which correspond to devices on a network. The metadata stored in the metadata repository may include class type information expressed in any suitable database format. The metadata gateway may be operable to send and receive metadata from the metadata repository database 322 via a communication protocol such as Common Management Information Service (CMIS) 305.

In one embodiment, the metadata gateway 320 provides translation of the metadata to and from the database format and an interface definition language, such as IDL. Therefore, the metadata gateway 320 comprises an external, IDL-based interface 310 to the object metadata. A primary benefit of using IDL is that IDL may be used to define object interfaces across a plurality of platforms and across a plurality of programming languages. As used herein, a "platform" typically includes a combination of an operating system and a set of computing hardware. This greatly eases the task of management applications 206 which need to access the object metadata in that a plurality of network management clients may obtain the metadata as expressed in a generic interface. In one embodiment, IDL may be used to construct a class-independent interface to all managed classes.

In one embodiment, the metadata gateway 320 provides CORBA clients with access to ASN1 metadata. CORBA-based clients can use the metadata gateway to access ASN1 type information about attributes or events and traverse the type tree. Conceptually, however, this metadata gateway is independent of the CORBA gateway or JIDM: that is, non-JIDM clients may also use the metadata gateway. In one embodiment, the metadata may be used by CORBA-based clients to construct a generic Graphical User Interface (GUI) to interface with any managed object class. CORBA-based clients may access object metadata for dynamic updating of object instance data. The metadata gateway 320 facilitates the dynamic addition and/or discovery of new object classes without the need to shut down the enterprise management system.

The metadata gateway 320 may include a library of data types expressed in an abstract syntax notation 314, such as Abstract Syntax Notation 1 (ASN1). The abstract syntax notation comprises a metadata notation language that may be used to represent metadata for managed objects. The library of abstract syntax notation types 314 may be coupled to the metadata repository 322 via a proprietary or platform-specific interface such as Portable Management Interface (PMI) 316.

As shown in FIG. 3, the metadata gateway 320 may further include a plurality of object types 312, where each object type may include one or more of the data types from a library of data types 314. In one embodiment, the plurality of object types comprises CORBA Objects. Requested metadata in the form of the object type nodes 312 may be translated to IDL through an IDL implementation 310 before being sent through the ORB 202 to the requesting manager application 206.

In one embodiment, the translation of the type information from the database format to the interface definition language may involve further translation of the type information from the database format to an abstract syntax notation, and from the abstract syntax notation to the interface definition language. Similarly, the translation of the type information from the abstract syntax notation to the interface definition language may further involve translating the type information from the abstract syntax notation to an object specification language (e.g., a language for describing or specifying objects for use in CORBA), and from the object specification language to the interface definition language. An information model of the managed object may be considered to exist in each of these data forms.

In one embodiment, the communications between the client manager applications and the ORB, as well as between the ORB and the metadata gateway occur via an Internet interobject communication protocol, such as IIOP.

It should be noted that the metadata gateway may be implemented on a single server machine, or distributed over a plurality of servers, where each of the plurality of servers presents a substantially identical view of the metadata gateway to a client manager application.

Figure 4:
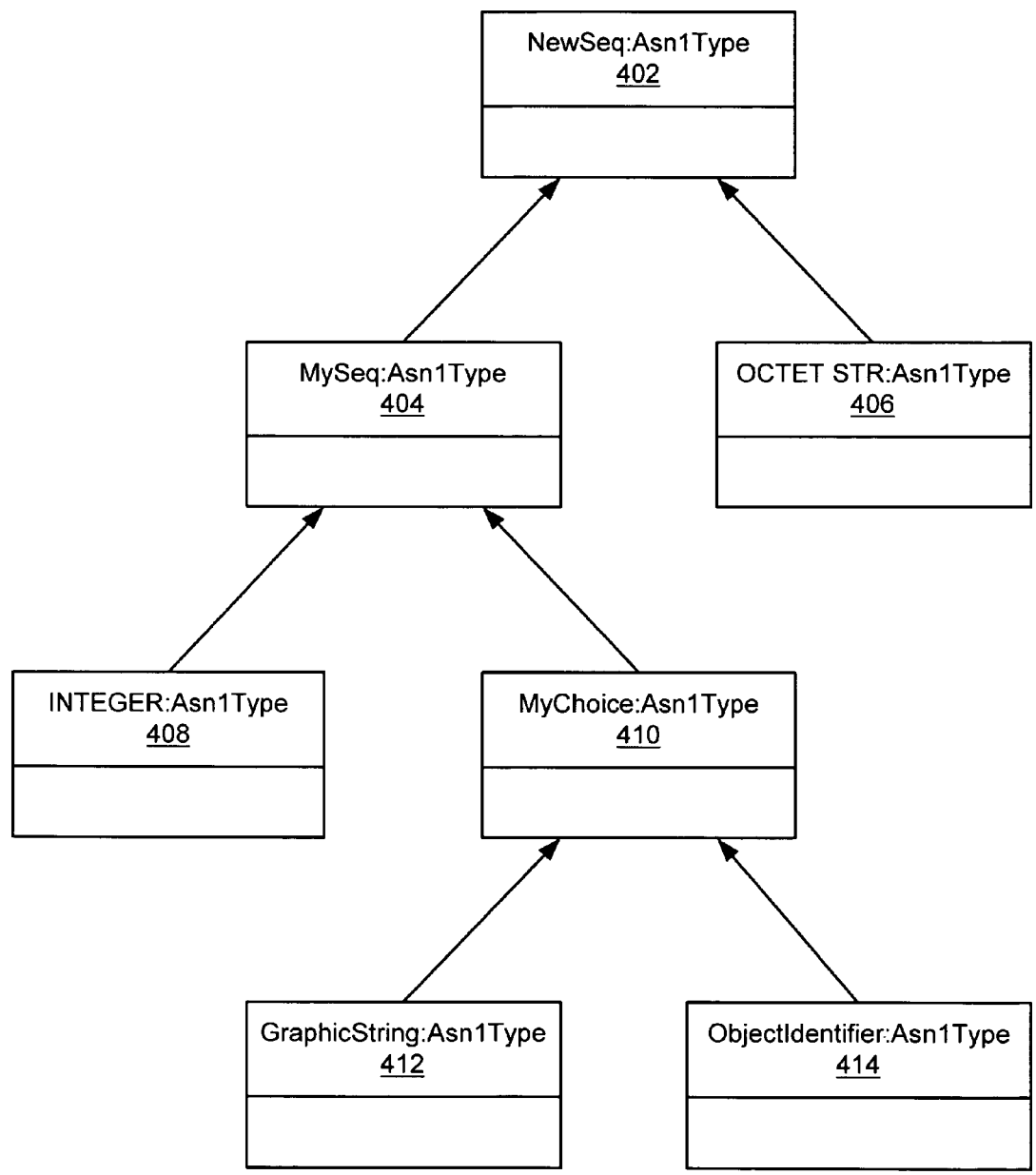
FIG. 4 is an illustration of managed object type structures according to one embodiment.

FIG. 4: Managed Object Type Structures

In one embodiment, the metadata gateway may provide access to metadata through a class-independent IDL, as described below. The metadata IDL exposed to clients is essentially a complete "IDL version" of TMN ASN1, defining a full access to ASN1 types, represented as Type Nodes, as described above with reference to FIG. 3. FIG. 4 illustrates an ASN1 object type node composition according to one embodiment. Providing access to metadata through the metadata gateway may include defining IDLs to provide the functionality to return the Type of a given attribute name or object ID (OID) as well as providing means to "walk" the subtypes given a Type. "Walking the subtypes" includes recursively stepping through and into object type nodes to access component subtypes of a non-primitive object data type.

In one example of the use of the metadata gateway, a user may wish to encode an IDL value for a managed object attribute. First, the user may get Type information for the attribute. Then the user may walk the Type and encode IDL values based on the subtypes.

In another example of the use of the metadata gateway, a user may wish to decode an IDL value for a managed object attribute. Again, the user may first get Type information for the attribute and then may walk the Type and decode subcomponent values off the IDL value.

In yet another example of the use of the metadata gateway, a user may wish to decode an Event received as an IDL value. The user may get Event Type information from the IDL value, then get Type information for the Event Type, and finally, walk the Type and decode subcomponent values off the IDL value.

The component subtypes of a managed object type may be represented as a tree structure. Assuming an object attribute whose syntax is NewSeq, in PMI ASN1Type classes, the attribute may be modeled as shown in FIG. 4, using the following container type structures:

MyChoice ::=CHOICE {
    foo [0] GraphicString,
    bar [1] OBJECT IDENTIFIER
}

MySeq ::=SEQUENCE {
    int INTEGER,
    choice MyChoice
}

NewSeq ::=SET {
    a [0] MySeq,
    b [1] OCTET STRING
}

As illustrated in FIG. 4, the ASN1 Type NewSeq 402 includes the ASN1 Type MySeq 404 and the ASN1 Type OCTET STRING 406. The ASN1 Type MySeq 404 includes the ASN1 Type INTEGER 408 and the ASN1 Type MyChoice 410, which further includes the ASN1 Type GraphicString 412 and the ASN1 Type ObjectIdentifier 414. In one embodiment, this type hierarchy may be represented by recursive containment, wherein each type structure contains its children in the tree. In this case, walking the type structure involves recursively stepping through and into each subcomponent of the type structure.

The metadata IDL may provide for encapsulation of the ASN1 tree structure described above, as well as a means of inspection of the ASN1Type for its type, tag, and constraints. The metadata IDL interface 310 may serve as the single point of entry into the world of ASN1 Types by providing access to the "root" of an ASN1Type. Additionally, the metadata IDL interface may provide utility functions to convert Object IDs to names and vice versa. The Type Node structure may wrap the actual ASN1Type definitions. Information on ASN1Types is returned in IDL structures to avoid the overhead of having too many CORBA objects to store and maintain. In other words, the metadata is returned by value. The metadata may contain the name of the type, tag information, base type information, constraints, default values, component list (for CHOICE, SET and SEQ), and other properties.

Figure 5:
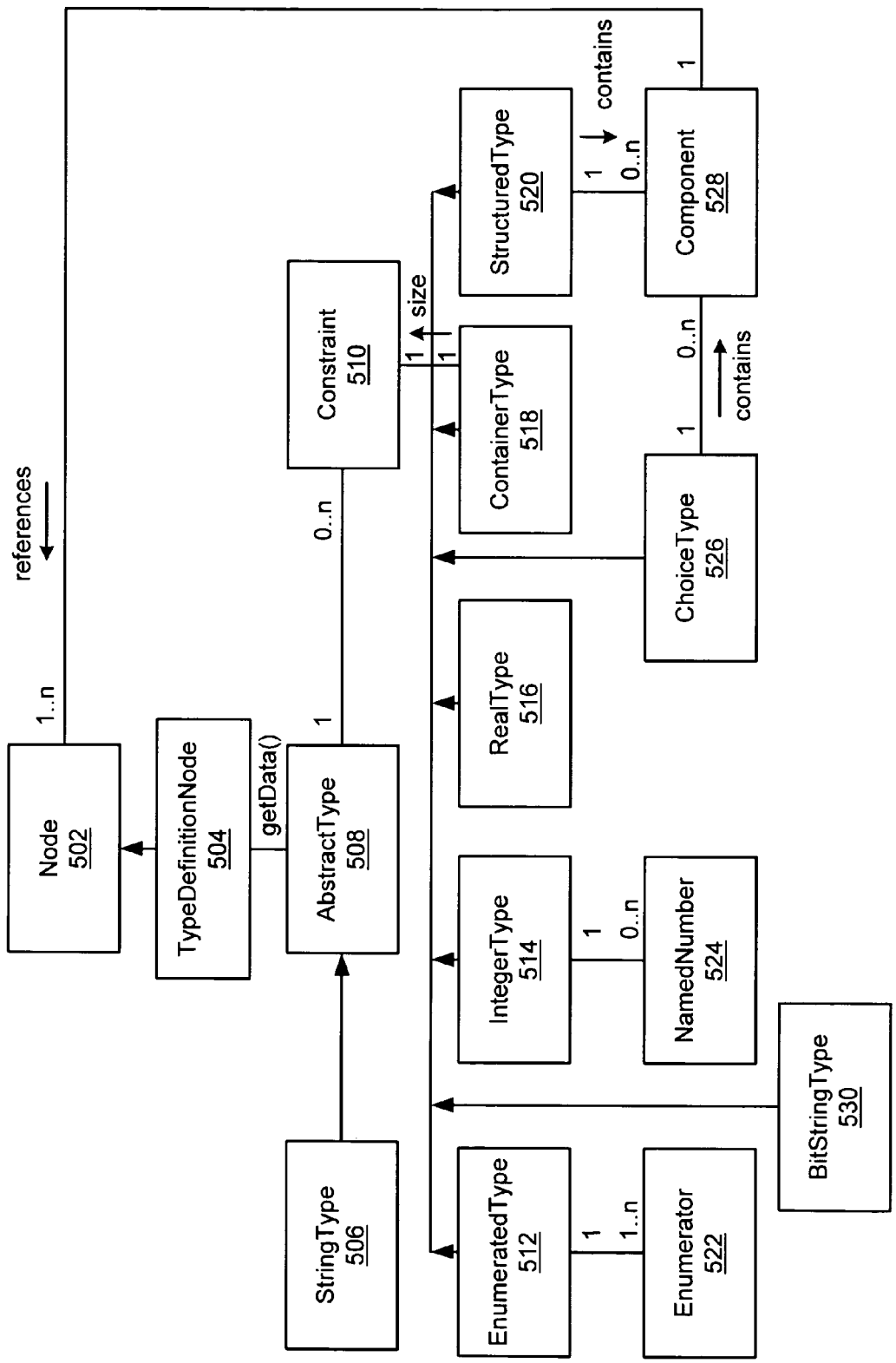
FIG. 5 is an illustration of an ASN1 type hierarchy according to one embodiment.

FIG. 5: ASN1 Type Hierarchy

FIG. 5 illustrates the ASN1 Type Class hierarchy and associations between classes according to one embodiment. These classes provide the component types in the ASN1 Type Library 314, described above with reference to FIG. 3, from which one may construct managed object class representations, described above with reference to FIG. 4. By design, the ASN1 Types follow an inheritance hierarchy; however, for performance reasons, individual classes may be modeled as IDL structures, and "instances" of a certain class may be represented as a sequence of structures from the base class. As shown in FIG. 5, the root type is Node 502. This is the superclass for the TypeDefinitionNode 504, which provides the function get Data( ) for use by subsequent subclasses. Derived from the TypeDefinitionNode 504 are AbstractType 508, which is the superclass of StringType 506, and the constrained types EnumeratedType 512, BitStringType 530, IntegerType 514, RealType 516, ChoiceType 526, ContainerType 518, and StructuredType 520. Furthermore, EnumeratedType 512 is the superclass of Enumerator 522, and IntegerType 514 is the superclass of NamedNumber 524. In addition, ChoiceType 526 and StructuredType 520 both contain Component 528. It should be noted that the Component type 528 references the root type Node 502. The fact that a given managed object's structured data type may include all subtype components explicitly as recursively contained substructures facilitates the "type walking" process mentioned above with reference to FIG. 4.

Figure 6:
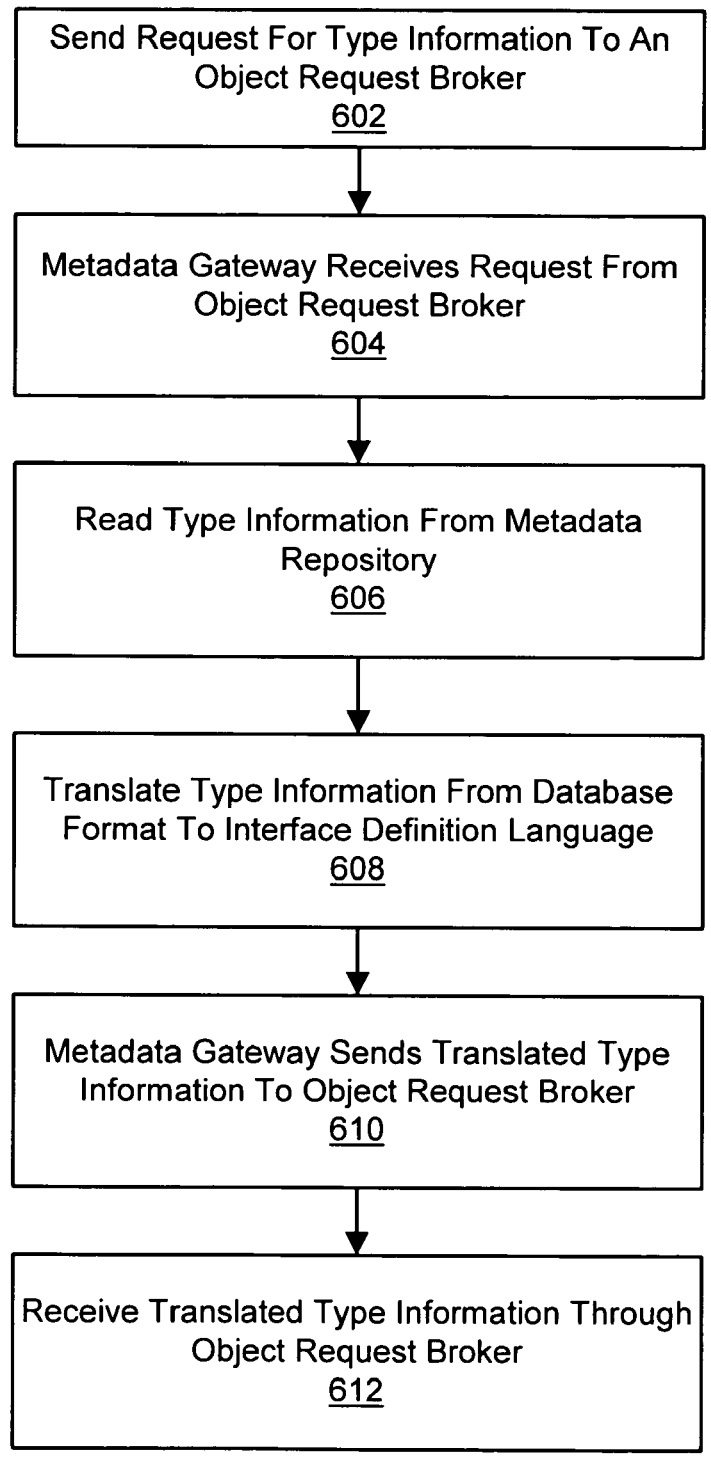
FIG. 6 is a flowchart of a metadata retrieval process according to one embodiment.

FIG. 6: Retrieving Metadata Via the Metadata Gateway

FIG. 6 illustrates a method for retrieving metadata through the metadata gateway according to one embodiment. In step 602, a client manager application generates and send a request for type information for a managed object attribute or event to an object request broker, such as CORBA ORB. This request may be expressed in an interface definition language such as OMG IDL, where the interface definition language is operable to define object interfaces across a plurality of platforms and across a plurality of programming languages.

In step 604, a metadata gateway receives the request for type information from the object request broker. In step 606, the metadata gateway reads the type information from a metadata repository, where the type information is stored in a database format. In step 608, the metadata gateway translates the retrieved type information from the database format to the interface definition language. As mentioned above, in one embodiment, the translation from the database format to the interface definition language may involve translating from the database format to an abstract syntax notation, then translating from the abstract syntax notation to an object specification language, such as CORBA Objects, and finally, translating from the object specification language to the interface definition language. In step 610, the metadata gateway sends the translated type information to the object request broker. In step 612, the client receives the translated type information for the attribute or event through the object request broker. The returned translated type information is expressed in the cross-platform, cross-programming language interface definition language.

Figure 7:
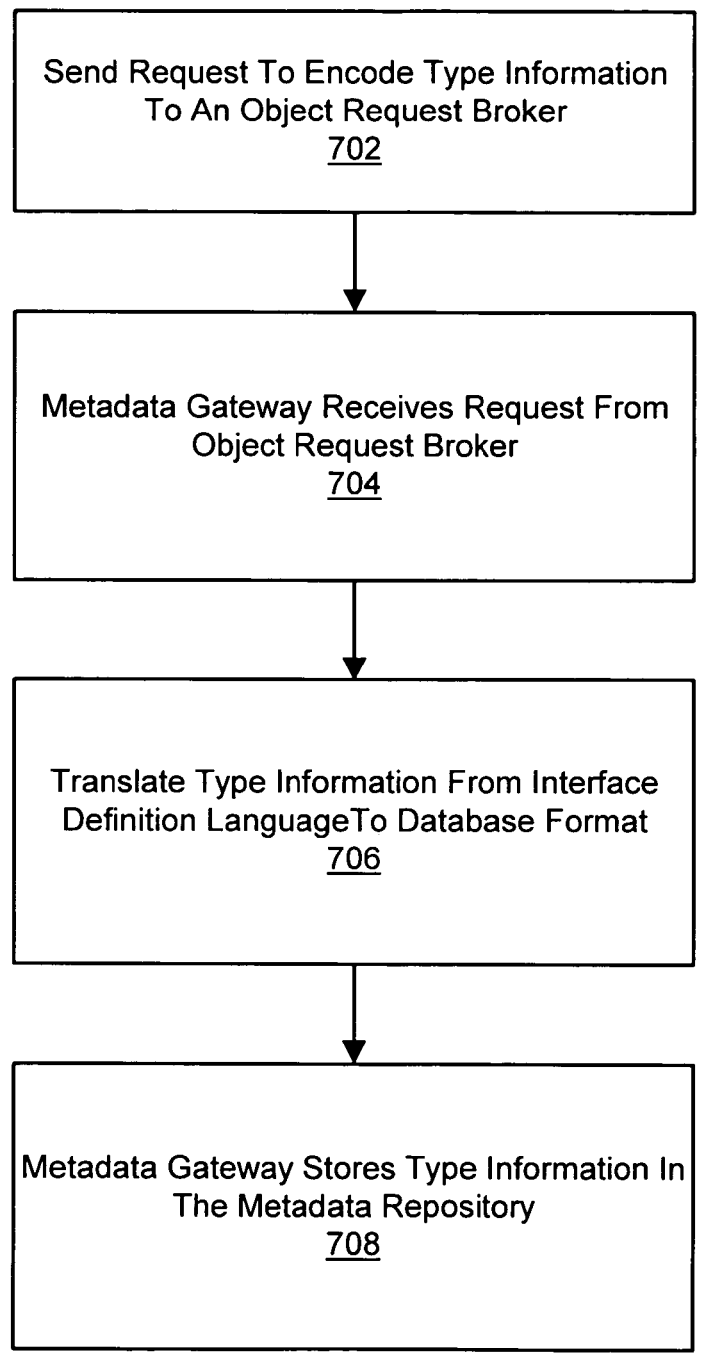
FIG. 7 is a flowchart of a metadata encoding process according to one embodiment.

FIG. 7: Encoding Metadata Via the Metadata Gateway

FIG. 7 illustrates a method for encoding metadata through the metadata gateway according to one embodiment. In step 702, a client manager application generates a request to encode type information for a managed object attribute or event to an object request broker, such as CORBA ORB. This request may be expressed in an interface definition language such as OMG IDL, where the interface definition language is operable to define object interfaces across a plurality of platforms and across a plurality of programming languages. In step 704, a metadata gateway may receive the request to encode type information from the object request broker. In step 706, the metadata gateway may translate the type information from the interface definition language to the database format. As mentioned above, the translation of type information from the interface definition language to the database format may involve further translations through an object specification language, such as CORBA Objects, and an abstract syntax notation, such as ASN1. In step 708, the metadata gateway may store the type information in the metadata repository.

In one embodiment, the translation of the type information from the interface definition language to the database format at step 706 may involve further translation of the type information from the interface definition language to an abstract syntax notation, and from the abstract syntax notation to the database format. Similarly, the translation of the type information from the interface definition language to the abstract syntax notation at may further involve translating the type information from the interface definition language to an object specification language, and from the object specification language to the abstract syntax notation. As mentioned above, an information model of the managed object may be considered to exist in each of these data forms.

Various embodiments may further include receiving or storing instructions and/or data implemented in accordance with the foregoing description upon a carrier medium. Suitable carrier media may include storage media or memory media such as magnetic or optical media, e.g., disk or CD-ROM, as well as transmission media or signals such as electrical, electromagnetic, or digital signals, conveyed via a communication medium such as network 108 and/or a wireless link.

While the present invention has been described with reference to particular embodiments, it will be understood that the embodiments are illustrated and that the invention scope is not so limited. Any variations, modifications, additions and improvements to the embodiments described are possible. These variations, modifications, additions and improvements may fall within the scope of the invention as detailed within the following claims.

What is claimed is:

1. A method for managing a network, the method comprising:
   a client generating a request for type information for an attribute or event pertaining to management of one or more managed network objects, wherein the request is expressed in an interface definition language, wherein the interface definition language is operable to define object interfaces across a plurality of platforms and across a plurality of programming languages, wherein each managed network object is a computer programming language object representing one or more devices on a network;
   sending the request for type information to an object request broker;
   a metadata gateway receiving the request for type information from the object request broker;
   reading the type information from a metadata repository, wherein the type information is stored in a database format in the metadata repository;
   translating the type information from the database format to the interface definition language;
   the metadata gateway sending the translated type information to the object request broker; and
   the client receiving the translated type information for the attribute or event through the object request broker, wherein the translated type information is expressed in the interface definition language.

2. The method of claim 1, wherein the translating the type information from the database format to the interface definition language comprises:
   translating the type information from the database format to an abstract syntax notation; and
   translating the type information from the abstract syntax notation to the interface definition language.

3. The method of claim 2, wherein the abstract syntax notation is Abstract Syntax Notation One (ASN1).

4. The method of claim 2, wherein the translating the type information from the abstract syntax notation to the interface definition language comprises:
   translating the type information from the abstract syntax notation to an object specification language; and
   translating the type information from the object specification language to the interface definition language.

5. The method of claim 1, wherein the sending the request for type information to an object request broker, the metadata gateway receiving the request for type information from the object request broker, the metadata gateway sending the translated type information to the object request broker, and the client receiving the translated type information for the attribute or event through the object request broker are effected via an internet inter-object communication protocol.

6. The method of claim 5, wherein the internet inter-object communication protocol comprises Internet Inter-Object Protocol (IIOP).

7. The method of claim 1, wherein the metadata gateway is implemented on a single server computer system.

8. The method of claim 1, wherein the metadata gateway is distributed over a plurality of servers, wherein each of the plurality of servers presents a functionally identical view of the metadata gateway.

9. The method of claim 1, wherein the interface definition language is class-independent.

10. A method for managing a network, the method comprising:
    a client generating a request to encode type information for an object, attribute, or event pertaining to management of one or more managed network objects, wherein the request is expressed in an interface definition language, wherein the interface definition language is operable to define object interfaces across a plurality of platforms and across a plurality of programming languages, wherein each managed network object is a computer programming language object that represents one or more devices on a network;
    sending the request to encode the type information to an object request broker;
    a metadata gateway receiving the request to encode the type information from the object request broker;
    translating the type information from the interface definition language to a database format; and
    storing the type information in a metadata repository, wherein the type information is stored in a database format in the metadata repository.

11. The method of claim 10, wherein the translating the type information from the interface definition language to the database format comprises:
    translating the type information from the interface definition language to an abstract syntax notation; and
    translating the type information from the abstract syntax notation to the database format.

12. The method of claim 11, wherein the translating the type information from the interface definition language to the abstract syntax notation comprises:
    translating the type information from the interface definition language to an object specification language; and
    translating the type information from the object specification language to the abstract syntax notation.

13. The method of claim 10, wherein the sending the request to an object request broker and the metadata gateway receiving the request to encode the type information from the object request broker are effected via an internet inter-object communication protocol.

14. A network management system comprising:
   a metadata repository, wherein the metadata repository comprises metadata concerning object classes for a plurality of managed objects, wherein the metadata comprises information expressed in a database format, and wherein the managed objects are computer programming language objects corresponding to managed devices on a network; and
   a metadata gateway which is communicatively coupled to the metadata repository and to an object request broker, wherein the metadata gateway is operable to send and receive the metadata from the database, wherein the metadata gateway provides translation of the metadata to and from the database format and an interface definition language, wherein the interface definition language is operable to define object interfaces across a plurality of platforms and across a plurality of programming languages.

15. The network management system of claim 14, wherein the managed devices comprise a telephone system.

16. The network management system of claim 14, wherein the managed devices comprise a network switch.

17. The network management system of claim 14, wherein the metadata gateway further comprises:
   a library of data types expressed in an abstract syntax notation, wherein the abstract syntax notation comprises a metadata notation language;
   a plurality of object types, wherein each object type comprises one or more of the data types from the library of data types; and
   an interface to the plurality of object types, wherein the interface is operable to provide one or more clients with access to the metadata as expressed in the interface definition language.

18. The network management system of claim 17, wherein the interface to the plurality of object types is a programming-language-independent and platform-independent interface.

19. The network management system of claim 17, wherein the plurality of object types comprise CORBA objects.

20. The network management system of claim 14, wherein the object request broker is configurable to be accessed by a plurality of network management clients to obtain the metadata as expressed in the generic interface.

21. The network management system of claim 14, wherein the object request broker comprises a CORBA ORB.

22. A tangible, computer-readable non-transitory storage medium comprising program instructions, wherein the program instructions are computer-executable to implement:
   a metadata gateway receiving a request for type information from an object request broker that received the request from a client, wherein the request is expressed in an interface definition language, wherein the interface definition language is operable to define object interfaces across a plurality of platforms and across a plurality of programming languages, wherein the type information pertains to management of one or more managed network objects, wherein each managed network object is a computer programming language object that represents one or more devices on a network;
   reading the type information from a metadata repository, wherein the type information is stored in a database format in the metadata repository;
   translating the type information from the database format to the interface definition language; and
   the metadata gateway sending the translated type information to the object request broker to send to the client.

23. The computer-readable storage accessible medium of claim 22, wherein in translating the type information from the database format to the interface definition language, the program instructions are further computer-executable to implement:
   translating the type information from the database format to an abstract syntax notation; and
   translating the type information from the abstract syntax notation to the interface definition language.

24. The computer-readable storage accessible medium of claim 23, wherein the abstract syntax notation is Abstract Syntax Notation One (ASN1).

25. The computer-readable storage accessible medium of claim 22, wherein in translating the type information from the abstract syntax notation to the interface definition language, the program instructions are further computer-executable to implement:
   translating the type information from the abstract syntax notation to an object specification language; and
   translating the type information from the object specification language to the interface definition language.

26. The computer accessible medium of claim 22, wherein the interface definition language is class-independent.

27. A tangible, computer-readable non-transitory storage medium comprising program instructions which are computer-executable to implement:
   a metadata gateway receiving a request to encode type information from an object request broker that received the request from a client, wherein the type information pertains to management of one or more managed network objects, wherein the request is expressed in an interface definition language, wherein the interface definition language is operable to define object interfaces across a plurality of platforms and across a plurality of programming languages, wherein each managed network object is a computer programming language object that represents one or more devices on a network;
   translating the type information from the interface definition language to a database format; and
   storing the type information in a metadata repository, wherein the type information is stored in a database format in the metadata repository.

28. The computer-readable storage accessible medium of claim 27, wherein in translating the type information from the interface definition language to the database format, the program instructions are further computer-executable to implement:
   translating the type information from the interface definition language to an abstract syntax notation; and
   translating the type information from the abstract syntax notation to the database format.

29. The computer-readable storage accessible medium of claim 28, wherein the abstract syntax notation is Abstract Syntax Notation One (ASN1).

30. The computer-readable storage accessible medium of claim 27, wherein in translating the type information from the interface definition language to the abstract syntax notation, the program instructions are further computer-executable to implement:
   translating the type information from the interface definition language to an object specification language; and
   translating the type information from the object specification language to the abstract syntax notation.

31. The computer-readable storage accessible medium of claim 27, wherein the interface definition language is class-independent.

* * * * *